United States Patent [19]

Oomi et al.

[11] Patent Number: 5,318,160
[45] Date of Patent: Jun. 7, 1994

[54] OVERRUNNING CLUTCH

[75] Inventors: Masanori Oomi, Anjo; Shozou Ikezima, Okazaki; Nobuhiko Uryu, Nagoya, all of Japan

[73] Assignee: Nippondenso Co., Ltd., Kariya, Japan

[21] Appl. No.: 994,042

[22] Filed: Dec. 18, 1992

[30] Foreign Application Priority Data

Dec. 19, 1991 [JP] Japan ............... 3-337047

[51] Int. Cl.$^5$ ............... F16D 3/34; F16D 13/74; F16D 13/72
[52] U.S. Cl. ............... 192/45; 192/42; 192/113.32
[58] Field of Search ............... 192/113 LR, 42, 45, 192/63; 384/313, 317, 368; 184/100, 101; 252/42

[56] References Cited

U.S. PATENT DOCUMENTS

| | | | |
|---|---|---|---|
| 3,668,236 | 6/1972 | Cyba | 260/485 G |
| 3,668,237 | 6/1972 | Cyba | 260/485 H |
| 3,691,854 | 9/1972 | Barthruff et al. | 192/45 X |
| 4,895,234 | 1/1990 | Fujino | 192/42 |
| 5,004,090 | 4/1991 | Kuribara et al. | 192/45 X |
| 5,156,246 | 10/1992 | Iga et al. | 192/45 |

FOREIGN PATENT DOCUMENTS 1-172642 7/1989 Japan .
3-4036 1/1991 Japan .

Primary Examiner—Leslie A. Braun
Assistant Examiner—Andrea Pitts
Attorney, Agent, or Firm—Cushman, Darby & Cushman

[57] ABSTRACT

An overrunning clutch which exhibits improved resistance to wear owing to grease filled thereinto which exhibits resistance to thermal oxidation even at increased temperatures due to overrunning. The overrunning clutch has a plurality of cam cases formed between its outer and inner members and also has a plurality of rollers arranged one by one in the cases. The cases are filled with a grease containing a first extreme pressure additive which is liquid and a second extreme pressure additive which is solid and yet melts at a prescribed temperature. Below the prescribed temperature, only the first extreme pressure additive functions as a lubricant, so that the rollers permit the engagement of the outer and inner members for the transmission of turning force from one member to the other. When the prescribed temperature is reached in the overrunning state, the second extreme pressure additive melts to function as a lubricant, thereby preventing the rollers from wearing. The second extreme pressure additive is halogen-based and decomposes below the ignition point of grease, thereby exhibiting flame retardance. Therefore, it also protects grease from thermal oxidation when the grease is heated to a temperature close to its ignition point.

24 Claims, 4 Drawing Sheets

OVERRUNNING CLUTCH

BACKGROUND OF THE INVENTION

1. Field of the Invention

The present invention relates to an overrunning clutch which is installed in the power transmission path from a starter motor (to start, for example, an internal combustion engine) to a pinion so as to achieve the power transmission from the motor to the pinion.

2. Description of related Arts

An overrunning clutch for a starter comprises an outer member which is driven by the motor, and an inner member, which is driven by the outer member. The transmission of turning force from the outer member to the inner member is accomplishad by rollers arranged in cam cases between them such that the rollers squeeze themselves between the inner wall of the outer member and the outer wall of the inner member.

These rollers are required to work in such a manner that they squeeze themselves between the inner wall of the outer member and the outer wall of the inner member when turning force is to be transmitted from the outer member to the inner member and they slip between them when the internal combustion engine has started and the inner member has begun to run faster than the outer member (in the overrunning state) and hence it is necessary to prevent the transmission of turning force from the inner member to the outer member. For the rollers to move smoothly, the cam case is filled with grease. This grease, therefore, should have some coefficient of friction so that it permits the rollers to transmit turning force, and it should also have good lubricity to permit the rollers to slip without wear during overrunning.

The grease deteriorates in lubricating performance after the prolonged overrunning state in which the pinion is driven by the ring gear and the inner member runs faster than the rollers, resulting in a temperature rise.

Therefore, it is common practice to mix the grease with an extreme pressure additive which forms a chloride film upon reaction with metal, thereby improving the lubricating performance and preventing the lubricating performance from deteriorating due to the temperature rise that occurs at the time of overrunning.

Since the grease needs to permit the rollers to squeeze themselves between the two members and also to slip between the two members, as mentioned above, the extreme pressure additive becomes inactive at about 250° C. and hence becomes incapable of maintaining the desired lubricating performance at higher temperatures.

In fact, a grease mix with an extreme pressure additive that exhibits good lubricating performance at high temperatures in excess of 250° C. has such good lubricating performance that the rollers cannot squeeze themselves between the two members, with the result being that the transmission of the necessary turning force is impossible.) The consequence of continued overrunning with a deteriorated extreme pressure additive would be worn rollers. As the rollers wear due to deteriorated lubricating performance, the temperature rises to such an extent that the grease undergoes thermal oxidation.

SUMMARY OF THE INVENTION

The present invention was completed to address the above-mentioned problem. It is an object of the present invention to provide a means to improve the wear resistance of rollers at the time of overrunning. It is another object of the present invention to provide a means to prevent the thermal oxidation of grease due to temperature rise.

The first object is achieved by an overrunning clutch comprising an outer member and an inner member which form cam cases between them, said cam cases containing rollers to transmit turning force from one member to the other and being filled with grease incorporated with a first extreme pressure additive which is liquid at normal temperature and a second extreme pressure additive which is solid at normal temperature and melts at a prescribed temperature. It permits the transmission of turning force (with the outer member engaging with the inner member) so long as the temperature is lower than a prescribed level at which only the first extreme pressure additive functions as a lubricant. However, it permits overrunning when the temperature rises to a prescribed level at which the second extreme pressure additive melts, functioning as a lubricant, thereby to prevent the rollers from wearing. The prescribed temperature at which the second extreme pressure additive melts may equal the temperature at which the first extreme pressure additive begins to deteriorate, because the rollers are protected from wearing until the temperature rises to cause the deterioration of the first extreme pressure additive. However, this is not limitative so long as the second extreme pressure additive exhibits its lubricating performance when the first extreme pressure additive has become deteriorated in lubricating performance.

The second object is achieved by using as the second extreme pressure additive a halogen-based additive which decomposes to exhibit flame retardance at a temperature lower than that at which grease undergoes thermal oxidation. The fact that the second extreme pressure additive exhibits flame retardance in the neighborhood of temperature at which grease undergoes thermal oxidation leads to the protection of greases from thermal oxidation.

DESCRIPTION OF THE PREFERRED EMBODIMENTS

Figure 1:
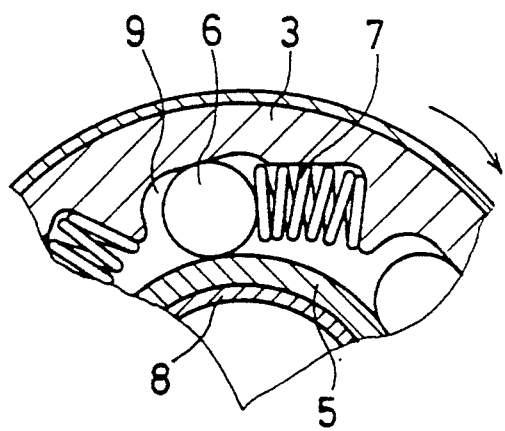
FIG. 1 is a partial sectional view showing an important part of the overrunning clutch.
Figure 2:
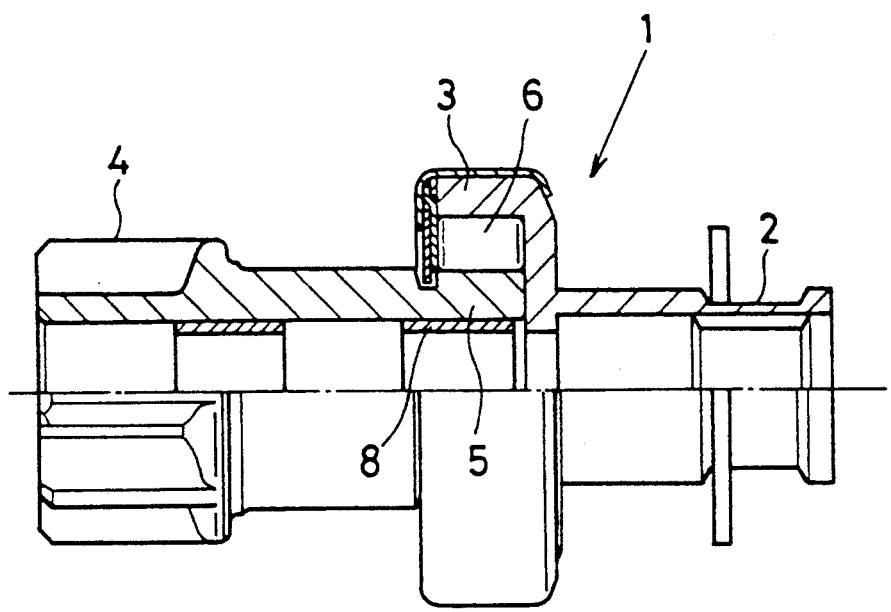
FIG. 2 is a half side sectional view showing an important part of a starter including the overrunning clutch.

In what follows the overrunning clutch of the present invention will be described with reference to FIGS. 1 to 4. Referring to FIG. 1, which is a partial sectional view showing an important part of the overrunning clutch, and to FIG. 2, which is a half side sectional view showing an important part of a starter including the overrunning clutch, there is shown the overrunning clutch 1 which is made up of an outer member 3 integral with a spline tube 2, an inner member 5 having a pinion 4 formed on the end thereof (left side in FIG. 2), rollers 6 to transmit the turning force from the outer member 3 to the inner member 5, and springs 7 acting on the rollers 6.

The outer member 3 is driven by an armature through the spline tube 2 fitted onto a splined armature shaft (not shown) The inner member 5 is rotatably and slidably fitted onto the armature shaft through a bearing 8.

The rollers 6 are arranged one by one in a plurality of wedge-shaped cam cases 9 formed between the outer member 3 and the inner member 5. Each roller 6 is biased by the spring 7 toward the narrower side of the cam case 9.

Figure 3:
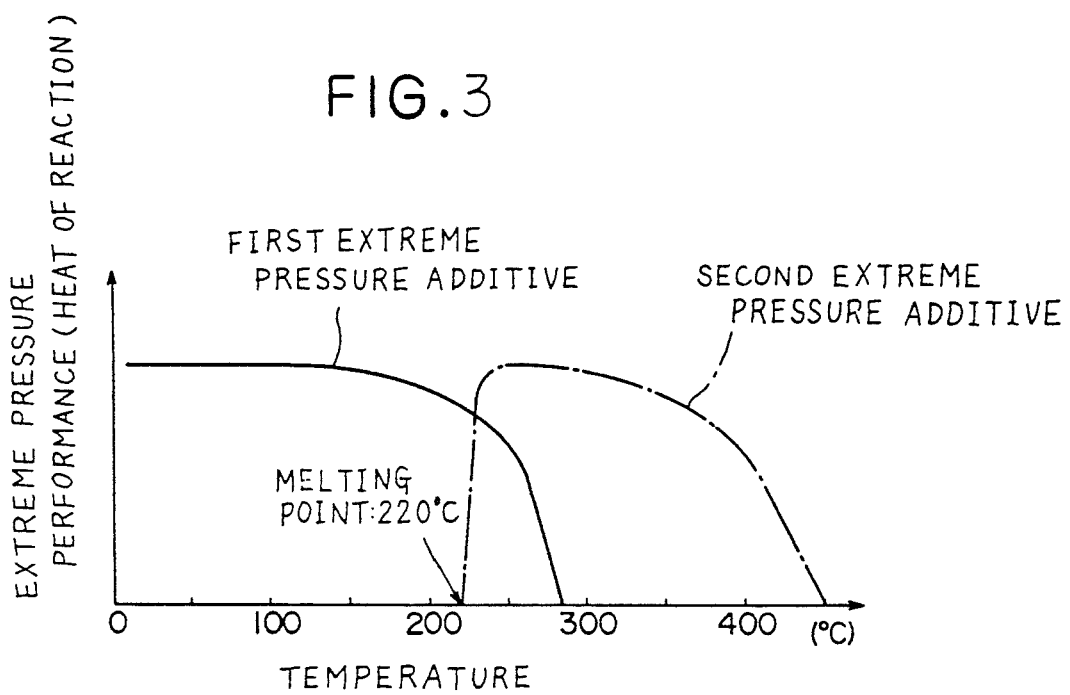
FIG. 3 is a graph showing the performance under extreme pressure of the first and second extreme pressure additives.

The cam case 9 is filled with grease to permit smooth clutch operation. The grease is composed of silicone base oil, lithium stearate (as a thickener), and two kinds of extreme pressure additives which form a chloride film upon reaction with metal. The first extreme pressure additive is dibutyl chlorendate which is liquid, and the second extreme pressure additive is chlorendic acid which is solid below approximately 220° C., or above the point (about 200° C.) where grease begins to lose its desired lubricating performance. Also, chlorendic acid undergoes thermal decomposition to give an inert gas at about 400° C. which is lower than the ignition point (about 450° C.) of the grease. (The extreme pressure performance on the ordinate in FIG. 3 is quantitatively represented in terms of the heat of reaction).

The overrunning clutch mentioned above works in the following manner. First, the armature drives the outer member 3 of the clutch (in the direction indicated by an arrow in FIG. 1). The rotating outer member 3 permits the roller 6 to roll toward the narrower side of the cam case under the pressure of the spring 7. The roller 6 squeezes itself between the outer member 3 and the inner member 5, thereby fastening them to each other. Thus the two members rotate at the same speed.

After the engine has started, the ring gear (not shown) begins to run faster than the armature, which creates the overrunning state in which the ring gear drives the pinion 4 and runs faster than the inner member 5 of the clutch. Thus the roller 6 compresses the spring 7 and rolls toward the wider side of the cam case 9. As the result, slipping takes place between the outer member 3 and the inner member 5.

Overrunning heats the grease. Until the grease temperature reaches about 250° C., the first extreme pressure additive (dibutyl chlorendate) reacts with metal to form chloride film, thereby protecting the grease from deteriorating in lubricating performance. Dibutyl chlorendate rapidly decreases in reactivity when the temperature exceeds about 250° C., as shown in FIG. 3. This drawback is compensated by the second extreme pressure additive (chlorendic acid), which melts at 220° C. to form chloride film. Therefore, the grease retains its lubricating performance even at high temperatures above 250° C. and hence protects the rollers 6 from wear.

When the temperature rises further, approaching about 450° C. (which is the ignition point of the grease), the second extreme pressure additive (chlorendic acid) undergoes thermal decomposition to form an inert gas in the neighborhood of 400° C. This inert gas isolates from air the combustible gas evolved from the grease. In other words, even though the second extreme pressure additive deteriorates in lubricating performance at high temperatures above 400° C., it continues to exhibit the flame retardance, thereby protecting the grease from thermal oxidation (ignition).

Figure 4:
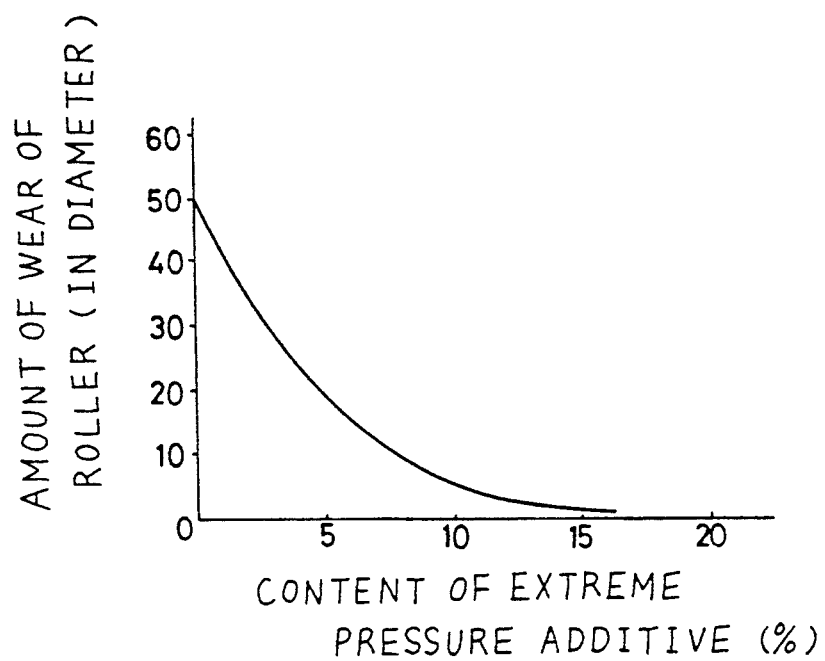
FIG. 4 is a graph showing the relationship between the content of the second extreme pressure additive and the wear of rollers.

The performance of the second extreme pressure additive (chlorendic acid) was tested by measuring the amount of wear of the rollers 6 in the overrunning state, with its content varied. The results are shown in FIG. 4. The sample was composed of 70 wt % silicone base oil (having a kinematic viscosity of 150 cSt at 40° C.), 20 wt % lithium stearate (as a thickener), 10 wt % dibutyl chlorendate (as a first extreme pressure additive), and tetrabromobenzene adduct of chlorendic acid (as a second extreme pressure additive) in varied amounts. It is noted from FIG. 4 that the amount of wear of the rollers 6 decreases as the content of the second extreme pressure additive increases and it approaches zero at the content beyond about 10 wt %.

The foregoing demonstrates that the grease incorporated with the first and second extreme pressure additives is superior in lubricating performance to the conventional one which is incorporated with only the first extreme pressure additive (and is represented by the zero content of the second extreme pressure additive in FIG. 4).

Incidentally, additional examples of the second extreme pressure additive include chlorendic acid derivative such as chlorendic anhydride and tetrabromobenzene adduct of chlorendic acid.

What is claimed is:

1. An overrunning clutch which comprises a cylindrical outer member having an inner wall and a first shaft fixed to one end of said cylindrical outer member, a cylindrical inner member having an outer wall and a second shaft fixed to one end of said cylindrical inner member and placed inside said outer member, a plurality of cam cases formed between the inner wall of said outer member and the outer wall of said inner member, a plurality of rollers arranged one by one in said cam cases such that when said first shaft rotates relative to said second shaft, each roller squeezes itself between the inner wall of said outer member and the outer wall of said inner member so as to permit the first and second shafts to rotate together, and when said second shaft rotates faster than the first shaft, each roller becomes idle between the inner wall of said outer member and the outer wall of said inner member so as to permit said second shaft to rotate faster than said first shaft, and a grease to fill said cam cases, said grease containing a first extreme pressure additive which is liquid and a second extreme pressure additive which is solid and melts at a prescribed temperature.

2. An overrunning clutch as defined in claim 1, wherein said second extreme pressure additive melts at a prescribed temperature which is reached by frictional heat that is evolved when said rollers slip on the inner wall of said outer member and the outer wall of said inner member.

3. An overrunning clutch as defined in claim 1, wherein said second extreme pressure additive melts at a prescribed temperature at which said first extreme pressure additive deteriorates in lubricating performance.

4. An overrunning clutch as defined in claim 3, wherein said first extreme pressure additive is one which deteriorates in lubricating performance after said grease begins to deteriorate in lubricating performance.

5. An overrunning clutch as defined in claim 1, wherein said second extreme pressure additive is a halogen-based additive which undergoes thermal decomposition and thereby produces an inert gas below an ignition point of said grease.

6. An overrunning clutch as defined in claim 2, wherein said second extreme pressure additive melts at a prescribed temperature at which said first extreme pressure additive deteriorates in lubricating performance.

7. An overrunning clutch as defined in claim 6, wherein said first extreme pressure additive is one which deteriorates in lubricating performance after said grease begins to deteriorate in lubricating performance.

8. An overrunning clutch as defined in claim 2, wherein said second extreme pressure additive is a halogen-based additive which undergoes thermal decomposition and thereby produces an inert gas below an ignition point of said grease.

9. An overrunning clutch which comprises a cylindrical outer member with an inner wall and a cylindrical inner member with an outer wall placed inside said outer member, said outer member being fixed to a first shaft which is driven by a motor and said inner member being fixed to a second shaft which has a pinion, a plurality of cam cases formed between the inner wall of said outer member and the outer wall of said inner member, a plurality of rollers arranged one by one in said cam cases such that when said first shaft rotates relative to said second shaft, each roller squeezes itself between the inner wall of said outer member and the outer wall of said inner member so as to prevent said first shaft to rotate relative to said second shaft, and a grease to fill said cam cases, said grease containing a first extreme pressure additive which is liquid and a second extreme pressure additive which is solid and melts at a prescribed temperature.

10. An overrunning clutch as defined in claim 9, wherein said second extreme pressure additive melts at a prescribed temperature which is reached by frictional heat that is evolved when said rollers slip on the inner wall of said outer member and the outer wall of said inner member.

11. An overrunning clutch as defined in claim 9, wherein said second extreme pressure additive melts at a prescribed temperature at which said first extreme pressure additive deteriorates in lubricating performance.

12. An overrunning clutch as defined in claim 11, wherein said first extreme pressure additives is one which deteriorates in lubricating performance after said grease begins to deteriorate in lubricating performance.

13. An overrunning clutch as defined in claim 9, wherein said second extreme pressure additive is a halogen-based additive which undergoes thermal decomposition and thereby produces an inert gas below an ignition point of said grease.

14. An overrunning clutch as defined in claim 10, wherein said second extreme pressure additive melts at a prescribed temperature at which said first extreme pressure additive deteriorates in lubricating performance.

15. An overrunning clutch as defined in claim 14, wherein said first extreme pressure additive is one which deteriorates in lubricating performance after said grease begins to deteriorate in lubricating performance.

16. An overrunning clutch as defined in claim 10, wherein said second extreme pressure additive is a halogen-based additive which undergoes thermal decomposition and thereby produces an inert gas below an ignition point of said grease.

17. An overrunning clutch which comprises a cylindrical outer member with an inner wall and a cylindrical inner member with an outer wall placed inside said outer member, said outer member being fixed to a first shaft which has a pinion and said inner member being fixed to a second shaft which is driven by a motor, a plurality of cam cases formed between the inner wall of said outer member and the outer wall of said inner member, a plurality of rollers arranged one by one in said cam cases such that when said first shaft rotates relative to said second shaft, each roller squeezes itself between the inner wall of said outer member and the outer wall of said inner member so as to prevent said first shaft to rotate relative to said second shaft, and a grease to fill said cam cases, said grease containing a first extreme pressure additive which is liquid and a second extreme pressure additive which is solid and melts at a prescribed temperature.

18. An overrunning clutch as defined in claim 17, wherein said second extreme pressure additive melts at a prescribed temperature which is reached by frictional heat that is evolved when said rollers slip on the inner wall of said outer member and the outer wall of said inner member.

19. An overrunning clutch as defined in claim 17, wherein said second extreme pressure additive melts at a prescribed temperature at which said first extreme pressure additive deteriorates in lubricating performance.

20. An overrunning clutch as defined in claim 19, wherein said first extreme pressure additive is one which deteriorates in lubricating performance after said grease begins to deteriorate in lubricating performance.

21. An overrunning clutch as defined in claim 17, wherein said second extreme pressure additive is a halogen-based additive which undergoes thermal decomposition and thereby produces an inert gas below an ignition point of said grease.

22. An overrunning clutch as defined in claim 18, wherein said second extreme pressure additive melts at a prescribed temperature at which said first extreme pressure additive deteriorates in lubricating performance.

23. An overrunning clutch as defined in claim 22, wherein said first extreme pressure additive is one which deteriorates in lubricating performance after said grease begins to deteriorate in lubricating performance.

24. An overrunning clutch as defined in claim 18, wherein said second extreme pressure additive is a halogen-based additive which undergoes thermal decomposition and thereby produces an inert gas below an ignition point of said grease.

* * * * *